Nov. 14, 1972   A. E. POTTER, JR   3,702,735
MULTISPECTRAL IMAGING SYSTEM
Filed May 12, 1971
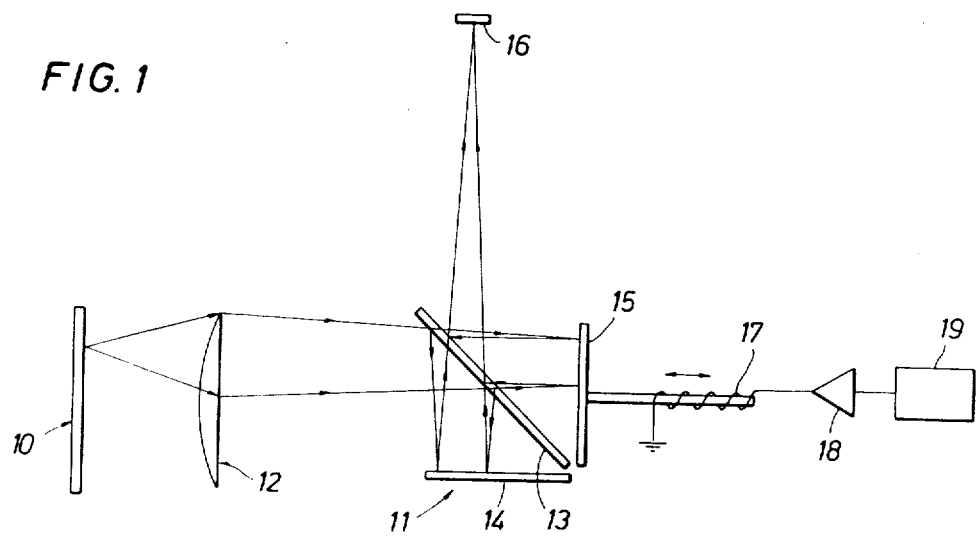
FIG. 1
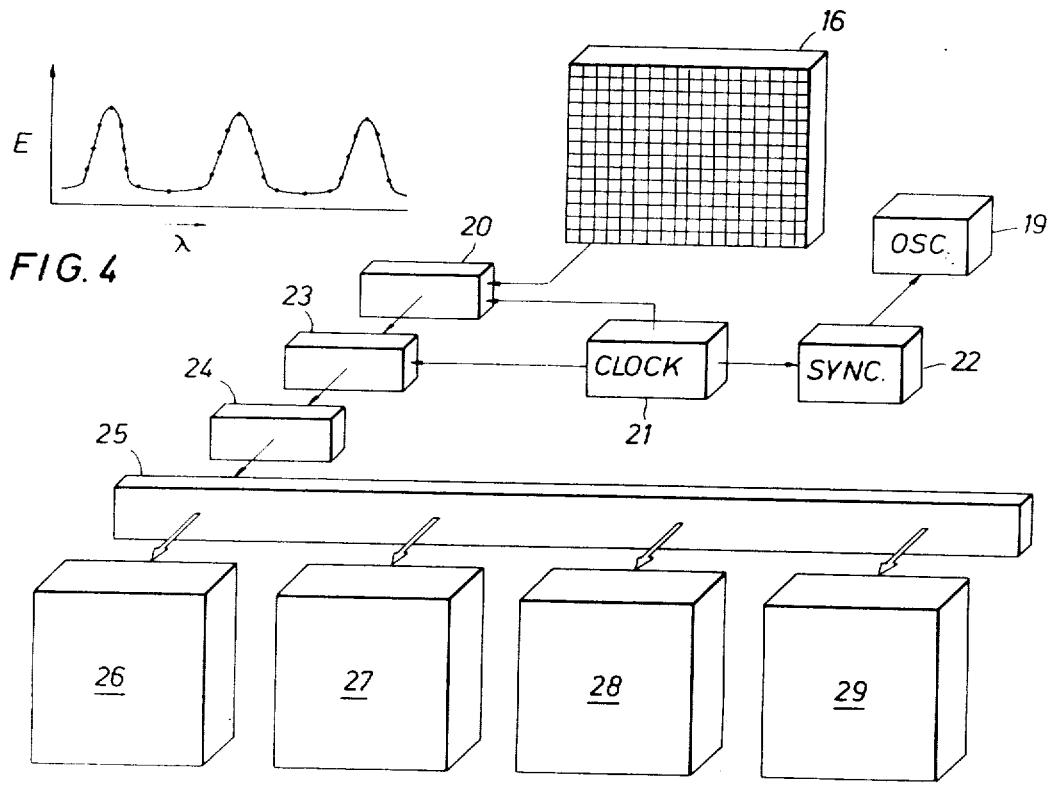
FIG. 4
FIG. 2
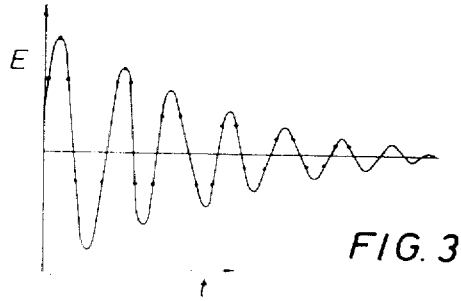
FIG. 3
Andrew E. Potter, Jr
INVENTOR
BY
M. G. Marnock
ATTORNEY

United States Patent Office 3,702,735
Patented Nov. 14, 1972

3,702,735
MULTISPECTRAL IMAGING SYSTEM
Andrew E. Potter, Jr., Houston, Tex., assignor to the United States of America as represented by the Administrator of the National Aeronautics and Space Administration
Filed May 12, 1971, Ser. No. 142,662
Int. Cl. G01b 9/02; G01n 21/34
U.S. Cl. 356—106 S
4 Claims

ABSTRACT OF THE DISCLOSURE

A system is disclosed for producing multiple images of a scene where the image is viewed from a single optical system and converted to separate displays at different light wavelengths. All the images are produced simultaneously. The embodiment disclosed includes a Michelson interferometer which transmits the light intensity to a mosaic of independent light detectors. The detectors are independently coupled to an analog to digital converter which digitizes the electrical response of the detectors. The digital signals are processed in a Fourier transform unit to provide signals as a function of wavelength. The signals from the unit are stored in a memory unit and selected by a scanner unit as a function of wavelength and the increment of the detector mosaic and applied to a display device. By virtue of the wavelength selection, different display devices are operated at different wavelengths to display the image at the selected wavelength.

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

Field of the invention

This invention relates to image display systems and, more particularly, to systems for displaying the same scene at different optical wavelengths on different display devices where the scene is obtained from a common optical system.

Description of the prior art

Heretofore, monochromatic images have been produced by placing a monochromatic light filter over a detector or array of detectors. Typically, only one wavelength at a time can be viewed, and a different filter is required for each wavelength, thus requiring change of filters. Obviously the same scene cannot be viewed at different wavelengths under the same conditions.

SUMMARY OF THE INVENTION

Accordingly, it is an object of this invention to provide a new and improved system for obtaining separate images at different wavelengths at the same time and under the same conditions.

Briefly stated, the invention contemplates a Michelson interferometer which transmits light to a mosaic of independent optical detectors. The detectors are independently coupled to an analog to digital converter which digitizes the electrical response of the detectors. The digital signals are procesesd in a Fourier transform unit to provide signals as a function of wavelength. The signals from the unit are stored in a memory unit and selected by a scanner unit as a function of wavelength and the increment of the detector mosaic and applied to a display device. The scanner provides an output for each wavelength to the separate display devices.

BRIEF DESCRIPTION OF THE DRAWING

Reference to the drawing will further explain the invention wherein like numerals refer to like parts, and in which:

FIG. 1 is a schematic view of the detector system of the invention;

FIG. 2 is a schematic view of a display system for displaying monochromatic images at different wavelengths of a single scene;

FIG. 3 is a waveform of a detector output as a function of time; and

FIG. 4 is a waveform of an output of the Fourier unit as a function of wavelength.

DESCRIPTION OF THE PREFERRED EMBODIMENT

Referring now to FIG. 1, a scene is depicted at 10, and a Michelson interferometer is shown at 11. Between the scene and interferometer is an imaging lens 12. Light from the scene is directed to the interferometer by the lens 12. The interferometer 11 has a beam splitter 13 tilted at an angle of 45° with respect to the path of incident light. Mounted to one side of the beam splitter 13 and parallel to the path of the incident light is a fixed mirror 14. On the other side of the beam splitter and facing the lens 12 is a mirror 15 which is suitably mounted to be reciprocated relative to the lens 12. Facing the mirror 14 is a photodetector mosaic 16 comprising 252 individual photodetectors in the illustrated embodiment of the invention.

Mirror 15 is reciprocated by means of a coil and magnet structure 17 driven by an amplifier 18 and saw tooth oscillator 19 which are conventional in nature. Thus, mirror 15 can be reciprocated and the light transmitted to the detector 16 fluctuates according to a time-amplitude function. Each individual photodetector in the detector 16 responds to the light to produce a corresponding voltage signal which is functionally related to the spectrogram of the light from the scene. As illustrated in FIG. 3, the signal output of an individual photodetector varies as a function of time and is a complex wave made up of many component frequencies corresponding to the various wavelength components in the incident light.

The detector 16 as noted heretofore is a mosaic array of individual photodetector elements. It receives the light from the scene, and the various elements detect individual light components focussed on the elements. The light components are individually representative of light intensity for different wavelengths. As shown schematically in FIG. 2, the electrical output of each detector element is transmitted to an associated analog to digital converter 20 where each of the component signals is translated into a digital signal. For purposes of clarity, only one converter 20 is shown in the drawing. Each converter 20 is periodically operated by a master clock 21 so that the digital signals are representative of the magnitude of the signal sampled at the time of sampling. The time period of the master clock is such that representative values for the signals can be obtained. The time intervals between the clock pulses are such that each output pulse corresponds to an increment of distance moved by the mirror 15. This is accomplished by synchronizing the clock through a synchronizing circuit 22 to the oscillator 19 which drives the mirror 15. The output of the converter 20 is thus a series of digital signals representative of the voltage of the detector element as a function of time. The time interval between the digital signals is controlled by the master clock. All the converters 20 are controlled by the same master clock.

The digital signals from the converter 20 are supplied to a Fourier transform unit 23. The Fourier transform unit is a conventional system in which a Fourier transformation is applied to the digitized signals to yield discrete signals which are related to the wavelength spectrum. Such a unit is commercially available from Digilab, Inc., Cambridge, Mass., under their designation FTS-14.

As shown in FIG. 4, the signals from a typical component waveform as shown in FIG. 3 are converted to a wavelength distribution and voltage function by the Fourier transform unit 23. There exists a digital converter 20 and a Fourier transform unit 23 for each detector element. Only one converter 20 and one Fourier transform unit 23 are shown schematically in order to simplify the representation. The Fourier unit signals are transferred to a memory unit 24 which retains the individual signals from all the detector elements.

The system described in detail above for conversion of the interferograms to spectrograms is a digital system, wherein the interferogram is digitized, and then transformed to a spectrogram in a small computer (the Fourier transform unit). An alternate system for conversion is an analog system, in which the interferogram is not digitized, but is input to a wave analyzer of a common commercial design. The output of the wave analyzer is digitized at predetermined frequency intervals and stored in the memory unit 24.

The memory unit 24 is interrogated by a scanner 25 programmed to scan the memory unit 24 at a selected wavelength value and supply all of the component values to a display device 26 such as a video tube. The video tube has the usual sequential scan over its surface so that the component values derived from the plurality of Fourier transform units associated with the several photodetectors are sequentially applied, each contributing an intensity value for a discrete portion on the tube. Thus, the response of each of the individual detector elements is reproduced on a tube, and the reproduction is in terms of a voltage signal for a particular wavelength. The scanner 25 scans the memory 24 for each of the desired wavelengths in sequence and produces corresponding displays on display devices 26–29. The time of the image retention of the display devices is less than the time interval of the scanning, so that each scanning of the scanner 25 is representative of the data measured. As illustrated in FIG. 2, the clock 21 coordinates the functions of converter 20 and units 23–25, so that the various sampled signals are properly processed.

With respect to the spatial or angular resolution of the system, the size of the detectors and the focal length of the imaging lens determine the angular resolution of the image formed of the scene. The size of the resolution element is equal to the solid angle viewed by each detector and is approximately $A/l^2$ steradians, where A is the detector area and $l$ is the focal length of the imaging lens. To view a scene of angular size B steradians, with an angular resolution of $A/l^2$ steradians, an array of $Bl^2/A$ detectors is needed.

The wavelength range of the imaging system is limited only by the transmission range of the system optics and the sensitivity range of the detectors. Operation of the system is possible in the visible, near-infrared, infrared, and far-infrared parts of the spectrum.

The wavelength range of the detector and the spectral resolution of the interferometer determine the number of monochromatic images. For example, lead sulfide detectors are sensitive from 1.2 to 2.8 microns when a glass imaging lens is used giving a range of 1.6 microns. If the resolution of the interferometer is 0.02 micron, eighty separate images can be produced. The spectral resolution R of the interferometer depends upon the distance $d$ over which the moving mirror moves. The relationship is that the resolution is equal to one divided by twice the distance, where resolution is in wavenumbers (the reciprocal of wavelength) and the distance is in centimeters. Thus, the number N of monochromatic images is determined by the stroke length of the moving mirror and the sensitivity range S wavenumbers of the detector. The number N of images is equal to 2S multiplied by the distance.

In summary of the disclosure, each detector element views a small part of a scene. When the interferometer is oscillated by the moving mirror, each detector element receives an interferogram signal which is functionally related to the spectrogram of light from the scene. Each detector is digitally sampled and the result transferred to the Fourier transform unit where the digitized signals are transformed to spectrograms, i.e., signals as a function of wavelength. These signals are used to construct images for each selected wavelength on a video display unit. While not illustrated, it is obvious that the signals from the detector elements may be recorded on tape and later replayed into the unit. Thus, the scenes can be viewed from an airplane and recorded for subsequent replay and reproduction.

Further modifications and alternative embodiments will be apparent to those skilled in the art in view of this description, and, accordingly, the foregoing specification is considered to be illustrative only.

What is claimed is:

1. An apparatus for simultaneously obtaining multiple images of a common scene from a single optical system wherein each image so obtained has a different light wavelength range comprising:

optical interferometer means, including a beam splitter, a reciprocal mirror, and a fixed mirror, for obtaining two interfering light paths for incident light;

means for uniformly reciprocating the reciprocal mirror of said interferometer, thereby varying the difference between the two interfering light paths within said interferometer and producing light at the output of said interferometer, which light fluctuates according to a time-amplitude function;

a plurality of detector means located in the path of the output of said interferometer for receiving the transmitted light from said interferometer and producing therefrom an output voltage from each one of said detector means whose amplitude is a function of time and which output is functionally related to the spectrogram of light from the viewed scene;

an analog-to-digital converter means coupled to each of said detector means for translating the output of each one of said detector means to a digital signal;

computer means coupled to each one of said converter means for applying a Fourier transformation to the digitized signals from each one of said converter means, thereby yielding discrete signals which are related to the wavelength spectrum;

memory means coupled to said computer means for storing the output of each of said computer means;

scanning means coupled to said memory means for scanning said memory means over selected wavelength range; and a plurality of display means independently coupled to said scanning means for receiving the output of said scanning means and producing on each display means a visual display corresponding to one of the selected wavelength ranges.

2. The apparatus of claim 1 further including clock means for effecting synchronous operation of said apparatus.

3. An apparatus for simultaneously obtaining multiple images of a common scene from a single optical system wherein each image so obtained has a different light wavelength range comprising:

optical interferometer means, including a beam splitter, a reciprocal mirror, and a fixed mirror, for obtaining two interfering light paths for incident light;

means for uniformly reciprocating the reciprocal mirror of said interferometer, thereby varying the difference between the two interfering light paths within said interferometer and producing light at the output of said interferometer, which light fluctuates according to a time-amplitude function;

a plurality of detector means located in the path of the output of said interferometer for receiving the transmitted light from said interferometer and producing therefrom an output voltage from each one of said detector means whose amplitude is a function of time and which output is functionally related to the spectrogram of light from the viewed scene;

wave analyzer means coupled to each of said detector means for translating the output of each one of said detector means to an analog frequency-amplitude function;

digitizing means coupled to said wave analyzer means for converting said analog frequency-amplitude function to digital signals;

memory means coupled to said digitizing means for storing the output of each of said digitizing means;

scanning means coupled to said memory means for scanning said memory means over selected wavelength ranges; and a plurality of display means independently coupled to said scanning means for receiving the output of said scanning means and producing on each display means a visual display corresponding to one of the selected wavelength ranges.

4. The apparatus of claim 3, further including clock means for effecting synchronous operation of said apparatus.

References Cited

UNITED STATES PATENTS

| | | | |
|---|---|---|---|
| 3,278,746 | 10/1966 | Fiat | 250—83.3 HP |
| 3,508,051 | 4/1970 | Nichols et al. | 250—83.3 HP |

OTHER REFERENCES

A Digital Recording system for Fourier Transform Spectrometry, Ibbett et al., Jour. of Scientific Instruments, 1968, Ser. 2, vol. 1, July, pp. 745–48.

RONALD L. WIBERT, Primary Examiner

V. P. McGRAW, Assistant Examiner

U.S. Cl. X.R.

250—83.3 HP; 356—74